(12) United States Patent
Todt et al.

(10) Patent No.: US 8,063,133 B2
(45) Date of Patent: Nov. 22, 2011

(54) POLY(ARYLENE ETHER) COMPOSITIONS, METHODS, AND ARTICLES

(75) Inventors: Michael Leslie Todt, Rexford, NY (US); Geuchien Jan Zijlma, Goes (NL)

(73) Assignee: Sabic Innovative Plastics IP B.V. (NL)

( * ) Notice: Subject to any disclaimer, the term of this patent is extended or adjusted under 35 U.S.C. 154(b) by 1107 days.

(21) Appl. No.: 11/762,408

(22) Filed: Jun. 13, 2007

(65) Prior Publication Data

US 2008/0312371 A1 Dec. 18, 2008

(51) Int. Cl.
  *B60C 1/00* (2006.01)
  *C08K 3/40* (2006.01)
  *C08K 5/06* (2006.01)
  *C08L 25/04* (2006.01)
  *C08L 25/06* (2006.01)
  *C08G 18/48* (2006.01)

(52) U.S. Cl. ......... 524/494; 524/577; 525/185; 525/132

(58) Field of Classification Search .................. 524/494, 524/577; 525/185, 132
See application file for complete search history.

(56) References Cited

U.S. PATENT DOCUMENTS

| | | | |
|---|---|---|---|
| 3,383,435 A | 5/1968 | Cizek et al. | |
| 3,708,455 A | 1/1973 | Nakanishi et al. | |
| 3,835,200 A | 9/1974 | Lee, Jr. | |
| 3,960,808 A | 6/1976 | Katchman | |
| 4,128,602 A | 12/1978 | Katchman et al. | |
| 4,128,603 A | 12/1978 | Katchman et al. | |
| 4,128,604 A | 12/1978 | Katchman et al. | |
| 4,242,254 A | 12/1980 | Abolins | |
| 4,423,189 A | 12/1983 | Haaf | |
| 4,543,391 A * | 9/1985 | Kuribayashi et al. | 525/68 |
| 4,892,904 A | 1/1990 | Ting | |
| 4,900,786 A | 2/1990 | Abolins et al. | |
| 5,214,109 A * | 5/1993 | Gallucci et al. | 525/397 |
| 5,523,360 A * | 6/1996 | Jelenic et al. | 525/397 |
| 6,762,218 B2 * | 7/2004 | Geprags et al. | 523/214 |
| 2002/0156185 A1 * | 10/2002 | Adedeji | 525/88 |
| 2002/0165317 A1 * | 11/2002 | Adedeji et al. | 525/63 |
| 2003/0075827 A1 * | 4/2003 | Demia et al. | 264/279 |
| 2003/0078331 A1 | 4/2003 | Kim et al. | |
| 2004/0026962 A1 | 2/2004 | Wieschermann et al. | |
| 2004/0059042 A1 | 3/2004 | Hartle et al. | |
| 2004/0068053 A1 | 4/2004 | Adedeji et al. | |
| 2005/0154130 A1 | 7/2005 | Adedeji et al. | |
| 2007/0117912 A1 * | 5/2007 | Balfour et al. | 524/538 |

FOREIGN PATENT DOCUMENTS

| | | |
|---|---|---|
| WO | 87/05311 A | 9/1987 |
| WO | 99/14273 A | 3/1999 |
| WO | 02/28971 A | 4/2002 |
| WO | 2004/026962 A | 4/2004 |
| WO | 2006/019410 A | 2/2006 |

OTHER PUBLICATIONS

Jacqueline I. Kroschwitz, Concise Encyclopedia of Polymer Science and Engineering, John Wiley & Sons, pp. 870-871.*
ISO 178 International Standard, "Plastics—Determination of Flexural Properties", Fourth Edition, Dec. 15, 2001, (20 pages).
ISO 527-2 International Standard, "Plastics—Determination of Tensile Properties" First Edition, Jun. 15, 1993, (8 pages).
ISO 1133 International Standard, "Plastics—Determination of the Melt Mass-Flow Rate (MFR) and the Melt Volume-Flow Rate (MVR) of Thermoplastics" Fourth Edition, Jun. 1, 2005, (20 pages).
International Searching Authority, International Search Report, International Application No. PCT/US2008/064617, Mailing Date: Aug. 18, 2008, 6 pages.
International Searching Authority, International Search Report, Written Opinion, International Application No. PCT/US2008/064617, Mailing Date: Aug. 18, 2008, 8 pages.
EP 0 529 378 A1, Publication date: Aug. 8, 1992, Abstract, 1 page.

* cited by examiner

*Primary Examiner* — James J. Seidleck
*Assistant Examiner* — Deve E Valdez
(74) *Attorney, Agent, or Firm* — Cantor Colburn LLP

(57) ABSTRACT

A thermoplastic composition includes particular amounts of a poly(arylene ether), a polystyrene, and glass fibers. The composition exhibits a highly desirable balance of stiffness, strength, and melt flow properties. Methods of preparing the composition are also described, as are articles prepared from the composition.

11 Claims, No Drawings

POLY(ARYLENE ETHER) COMPOSITIONS, METHODS, AND ARTICLES

BACKGROUND OF THE INVENTION

Poly(arylene ether) resin is a type of plastic known for its excellent water resistance, dimensional stability, and inherent flame retardancy. Properties such as strength, stiffness, chemical resistance, and heat resistance can be tailored by blending it with various other plastics in order to meet the requirements of a wide variety of consumer products, for example, plumbing fixtures, electrical boxes, automotive parts, and coated wire.

Blends of poly(arylene ether) and polystyrene are known to possess improved stiffness and tensile strength relative to either component resin alone. See, for example, U.S. Pat. No. 3,383,435 to Cizek. However, known blends of poly(arylene ether) and polystyrene do not possess the properties required for certain product applications. For example, water meter pressure plates must be quite thin (typically about 1 to 2 millimeters thick) yet strong enough to withstand substantial pressure differentials and also very dimensionally stable. They can also have complex shapes that can only be molded with a high-flow composition. This combination of properties not exhibited by known poly(arylene ether)/polystyrene blends. Accordingly, there is a need for poly(arylene ether)/polystyrene blends that exhibit an improved balance of stiffness, tensile, and melt flow properties.

BRIEF DESCRIPTION OF THE INVENTION

The above-described and other drawbacks are alleviated by a composition, comprising: about 20 to about 36 weight percent of a poly(arylene ether); about 10 to about 35 weight percent of a polystyrene; and about 30 to about 50 weight percent glass fibers; wherein all weight percents are based on the total weight of the composition; and wherein the composition exhibits a tensile strength of at least 140 megapascals measured at 23° C. according to ISO 527, a tensile knitline strength of at least 50 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133.

Another embodiment is a composition, comprising: about 30 to about 35 weight percent of a poly(2,6-dimethyl-1,4-phenylene ether) having a post-compounding weight average molecular weight of about 50,000 to about 60,000 atomic mass units; about 20 to about 25 weight percent of an atactic homopolystyrene having a number average molecular weight of about 30,000 to about 100,000 atomic mass units; about 0.2 to about 2 weight percent of a mold release agent; and about 35 to about 45 weight percent glass fibers having a diameter of about 10 to about 20 micrometers; wherein all weight percents are based on the total weight of the composition; and wherein the composition is free of any polymer other than the poly(2,6-dimethyl-1,4-phenylene ether), the atactic homopolystyrene, and the mold release agent; and wherein the composition exhibits a tensile strength of at least 145 megapascals measured at 23° C. according to ISO 527, a tensile knitline strength of at least 55 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133.

Another embodiment is a composition, consisting of: about 30 to about 35 weight percent of a poly(2,6-dimethyl-1,4-phenylene ether) having a post-compounding weight average molecular weight of about 50,000 to about 60,000 atomic mass units; about 20 to about 25 weight percent of an atactic homopolystyrene having a number average molecular weight of about 30,000 to about 100,000 atomic mass units; about 0.2 to about 2 weight percent of a mold release agent; and about 35 to about 45 weight percent glass fibers having a diameter of about 10 to about 20 micrometers; and optionally, up to 5 weight percent of an additive selected from the group consisting of stabilizers, processing aids, drip retardants, nucleating agents, dyes, pigments, antioxidants, anti-static agents, blowing agents, metal deactivators, antiblocking agents, fragrances, and combinations thereof; wherein all weight percents are based on the total weight of the composition; and wherein the composition is free of any polymer other than the poly(2,6-dimethyl-1,4-phenylene ether), the atactic homopolystyrene, and the mold release agent; and wherein the composition exhibits a tensile strength of at least 145 megapascals measured at 23° C. according to ISO 527, a tensile knitline strength of at least 55 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133.

Another embodiment is an article comprising a composition comprising: about 20 to about 36 weight percent of a poly(arylene ether); about 10 to about 35 weight percent of a polystyrene; and about 30 to about 50 weight percent glass fibers; wherein all weight percents are based on the total weight of the composition; and wherein the composition exhibits a tensile strength of at least 140 megapascals measured at 23° C. according to ISO 527, a tensile knitline strength of at least 50 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133.

Another embodiment is an article comprising a composition comprising: about 30 to about 35 weight percent of a poly(2,6-dimethyl-1,4-phenylene ether) having a post-compounding weight average molecular weight of about 50,000 to about 60,000 atomic mass units; about 20 to about 25 weight percent of an atactic homopolystyrene having a number average molecular weight of about 30,000 to about 100,000 atomic mass units; about 0.2 to about 2 weight percent of a mold release agent; and about 35 to about 45 weight percent glass fibers having a diameter of about 10 to about 20 micrometers; wherein all weight percents are based on the total weight of the composition; and wherein the composition is free of any polymer other than the poly(2,6-dimethyl-1,4-phenylene ether), the atactic homopolystyrene, and the mold release agent; and wherein the composition exhibits a tensile strength of at least 145 megapascals measured at 23° C. according to ISO 527, a tensile knitline strength of at least 55 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133.

Another embodiment is an article comprising a composition consisting of: about 30 to about 35 weight percent of a poly(2,6-dimethyl-1,4-phenylene ether) having a post-compounding weight average molecular weight of about 50,000 to about 60,000 atomic mass units; about 20 to about 25 weight percent of an atactic homopolystyrene having a number average molecular weight of about 30,000 to about 100,000 atomic mass units; about 0.2 to about 2 weight percent of a mold release agent; and about 35 to about 45 weight percent glass fibers having a diameter of about 10 to about 20 micrometers; and optionally, up to 5 weight percent of an additive selected from the group consisting of stabilizers, processing aids, drip retardants, nucleating agents, dyes, pigments, antioxidants, anti-static agents, blowing agents, metal deactivators, antiblocking agents, fragrances, and combinations thereof; wherein all weight percents are based on the total weight of the composition; and wherein the composition is free of any polymer other than the poly(2,6-dimethyl-1,4-phenylene ether), the atactic homopolystyrene, and the mold release agent; and wherein the composition exhibits a tensile strength of at least 145 megapascals measured at 23° C. according to ISO 527, a tensile knitline strength of at least 55 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133.

Another embodiment is a method of preparing a composition, comprising: melt kneading about 20 to about 36 weight percent of a poly(arylene ether), about 10 to about 35 weight percent of a polystyrene, and about 30 to about 50 weight percent glass fibers to form a composition; wherein all weight percents are based on the total weight of the composition; and wherein the composition exhibits a tensile strength of at least 140 megapascals measured at 23° C. according to ISO 527, a tensile knitline strength of at least 50 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133.

DETAILED DESCRIPTION OF THE INVENTION

The present inventors have discovered that an improved balance of stiffness, tensile, and melt flow properties can be achieved in a poly(arylene ether)/polystyrene composition comprising very particular amounts of poly(arylene ether), polystyrene, and glass fibers. Thus, one embodiment is a composition, comprising: about 20 to about 36 weight percent of a poly(arylene ether); about 10 to about 35 weight percent of a polystyrene; and about 30 to about 50 weight percent glass fibers; wherein all weight percents are based on the total weight of the composition; and wherein the composition exhibits a tensile strength of at least 140 megapascals measured at 23° C. according to ISO 527, a tensile knitline strength of at least 50 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133. Even higher tensile strengths are possible. Thus, in some embodiments, the tensile strength is at least 145 megapascals, specifically at least 150 megapascals, more specifically 140 to about 160 megapascals, even more specifically 140 to about 155 megapascals. Higher tensile knitline strengths are also possible. Thus, in some embodiments, the tensile knitline strength is at least 55 megapascals, specifically at least 60 megapascals, more specifically 50 to about 70 megapascals, even more specifically 50 to about 65 megapascals. Higher flexural strengths are also possible.

Thus, in some embodiments, the flexural strength is 180 to about 230 megapascals, specifically 180 to about 225 megapascals. Higher melt volume-flow rates are also possible. Thus, in some embodiments, the volume melt-flow rate is at least 20 milliliters per 10 minutes, specifically 15 to about 25 milliliters per 10 minutes. It was quite unexpected to be able to achieve this combination of properties in a poly(arylene ether)/polystyrene composition. Typically high strength and stiffness are achieved by increasing the glass loading or glass length in the compounded resin. However, this results in a lower melt flow. Furthermore, if glass loading is increased and the melt flow of the molten composition remains the same, the wetting of the glass is typically reduced, leading to poor adhesion and lower strength. At the time the inventors were conducting their research, little was known about how the critical properties were affected by specific variations in the composition, and it was not only impossible to predict what a specific composition would provide the desired property combination, there was considerable skepticism about whether any poly(arylene ether)/polystyrene composition could provide the desired property combination.

The composition comprises a poly(arylene ether). Suitable poly(arylene ether)s include those comprising repeating structural units having the formula

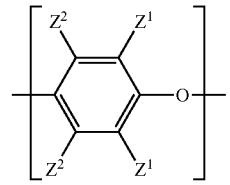

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more heteroatoms such as halogens, oxygen, nitrogen, sulfur, silicon, or phosphorus. When substituted, the hydrocarbyl residue can contain the heteroatoms pendant to or within the backbone of the hydrocarbon residue. As one example, $Z^1$ can be a di-n-butylaminomethyl group formed by reaction of the methyl group of a terminal 1-hydroxy-2,6-dimethylphenylene residue with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

As noted above, the poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a random copolymer, a graft copolymer, an ionomer, or a block copolymer, as well as combinations comprising at least one of the foregoing.

The present inventors have observed that the balance of flow properties, stiffness, and tensile properties is particularly improved when the poly(arylene ether) has a pre-compounding weight average molecular weight of about 40,000 to about 50,000 atomic mass units, specifically about 43,000 to about 47,000 atomic mass units, as determined by gel permeation chromatography using polystyrene standards. As used herein, the term "pre-compounding weight average molecular weight" refers to the molecular weight of the poly(arylene ether) component before it is compounded with the other components to form the composition. The present inventors have also observed that the property balance is particularly advantaged when the poly(arylene ether) contains substantial fractions of high and low molecular weight species. Specifically, the poly(arylene ether) can have a pre-compounding molecular weight distribution comprising about 15 to about 20 weight percent of molecules having a molecular weight less than or equal to 12,000 atomic mass units, and/or about 15 weight percent of molecules having a molecular weight greater than or equal to 100,000 atomic mass units. As understood by one skilled in the art, the molecular weight of the poly(arylene ether) can increase substantially during melt mixing. Thus, in some embodiments, the poly(arylene ether) has a post-compounding weight average molecular weight of about 50,000 to about 60,000 atomic mass units, specifically about 53,000 to about 57,000 atomic mass units.

The composition comprises the poly(arylene ether) in an amount of about 20 to about 36 weight percent, specifically about 27 to about 34 weight percent, more specifically about 30 to about 34 weight percent, based on the total weight of the composition.

In addition to the poly(arylene ether), the composition comprises a polystyrene. As used herein, the term "polystyrene" refers to a polymer comprising at least 90 weight percent of repeating units derived from polymerization of styrene. In some embodiments, the polystyrene comprises at least 95 weight percent, specifically at least 98 weight percent, of repeating units derived from polymerization of styrene. In some embodiments, the polystyrene is a styrene homopolymer. The styrene homopolymer can be atactic, isotactic, or syndiotactic.

The polystyrene can have a number average molecular weight of about 10,000 to about 200,000 atomic mass units, specifically about 30,000 to about 100,000 atomic mass units. In a particular embodiment, the polystyrene is an atactic homopolystyrene having a number average molecular weight of about 30,000 to about 100,000 atomic mass units.

The composition comprises the polystyrene in an amount of about 10 to about 35 weight percent, specifically about 15 to about 30 weight percent, more specifically about 20 to about 28 weight percent, based on the total weight of the composition.

As the polystyrene component is defined as comprising at least 90 weight percent of repeating units derived from polymerization of styrene, it therefore excludes styrenic copolymers comprising less than 90 weight percent polymerized styrene. For example, excluded from the polystyrene component are rubber-modified polystyrenes comprises more than 10 weight percent rubber. As another example, excluded from the polystyrene component are styrenic block copolymers comprising more than 10 weight percent of repeating units derived from any monomer or combination of monomers other than styrene. Although such polymers are not polystyrene as defined herein, they can, optionally, be including in the composition as an additional component. However, it may be preferred to limit their quantity or completely exclude them. For example, in some embodiments, the composition comprises rubber-modified polystyrene in an amount of less than or equal to 5 weight percent. In some embodiments, the composition is free of rubber-modified polystyrene. In some embodiments, the composition comprises less than or equal to 5 weight percent of any polymer other than the poly(arylene ether) and the polystyrene. In some embodiments, the composition optionally further comprises a polymeric mold release agent, and the composition is free of any polymer other than the poly(arylene ether), the polystyrene, and the polymeric mold release agent.

In addition to the poly(arylene ether) and the polystyrene, the composition comprises glass fibers. Suitable glass fibers include those based on E, A, C, ECR, R, S, D, and NE glasses, as well as quartz. The glass fiber can have a diameter of about 2 to about 30 micrometers, specifically about 5 to about 25 micrometers, more specifically about 10 to about 15 micrometers. The length of the glass fibers before compounding can be about 2 to about 7 millimeters, specifically about 3 to about 5 millimeters. The glass fiber can, optionally, include a so-called adhesion promoter to improve its compatibility with the thermoplastic composition. Adhesion promoters include chromium complexes, silanes, titanates, zirco-aluminates, propylene maleic anhydride copolymers, reactive cellulose esters and the like. Suitable glass fiber is commercially available from suppliers including, for example, Owens Corning, Nippon Electric Glass, PPG, and Johns Manville. The composition comprises the glass fibers in an amount of about 30 to about 50 weight percent, specifically about 35 to about 45 weight percent, based on the total weight of the composition.

In some embodiments, the composition comprises about 30 to about 35 weight percent of the poly(arylene ether), about 15 to about 30 weight percent of the polystyrene, and about 35 to about 45 weight percent of the glass fibers, all based on the total weight of the composition.

One embodiment is a composition, comprising: about 30 to about 35 weight percent of a poly(2,6-dimethyl-1,4-phenylene ether) having a post-compounding weight average molecular weight of about 50,000 to about 60,000 atomic mass units; about 20 to about 25 weight percent of an atactic homopolystyrene having a number average molecular weight of about 30,000 to about 100,000 atomic mass units; about 0.2 to about 2 weight percent of a mold release agent; and about 35 to about 45 weight percent glass fibers having a diameter of about 10 to about 20 micrometers; wherein all weight percents are based on the total weight of the composition; and wherein the composition is free of any polymer other than the poly(2,6-dimethyl-1,4-phenylene ether), the atactic homopolystyrene, and the mold release agent; and wherein the composition exhibits a tensile strength of at least 145 megapascals measured at 23° C. according to ISO 527, a tensile knitline strength of at least 55 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133. Specifically, the composition can exhibit a tensile strength of 145 to about 160 megapascals, a tensile knitline strength of 55 to about 70 megapascals, a flexural strength of 180 to about 230 megapascals, and a melt volume-flow rate of 15 to about 25 milliliters per 10 minutes.

One embodiment is a composition, consisting of: about 30 to about 35 weight percent of a poly(2,6-dimethyl-1,4-phenylene ether) having a post-compounding weight average molecular weight of about 50,000 to about 60,000 atomic mass units; about 20 to about 25 weight percent of an atactic homopolystyrene having a number average molecular weight of about 30,000 to about 100,000 atomic mass units; about 0.2 to about 2 weight percent of a mold release agent; and about 35 to about 45 weight percent glass fibers having a diameter of about 10 to about 20 micrometers; and optionally, up to 5 weight percent of an additive selected from the group consisting of stabilizers, processing aids, drip retardants, nucleating agents, dyes, pigments, antioxidants, anti-static agents, blowing agents, metal deactivators, antiblocking agents, fragrances, and combinations thereof; wherein all weight percents are based on the total weight of the composition; and wherein the composition is free of any polymer other than the poly(2,6-dimethyl-1,4-phenylene ether), the atactic homopolystyrene, and the mold release agent; and wherein the composition exhibits a tensile strength of at least 145 megapascals measured at 23° C. according to ISO 527, a tensile knitline strength of at least 55 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133. Specifically, the composition can exhibit a tensile strength of 145 to about 160 megapascals, a tensile knitline strength of 55 to about 70 megapascals, a flexural strength of 180 to about 230 megapascals, and a melt volume-flow rate of 15 to about 25 milliliters per 10 minutes.

Other embodiments include articles comprising any of the above-described compositions. The composition is useful for the fabrication of articles, including the internal components of water meters (such as water meter pressure plates), pump housings, and pump impeller blades. Suitable fabrication methods can include injection molding, compression molding, or a combination thereof. Other embodiments include methods of preparing the composition. Thus, one embodiment is a method of preparing a composition, comprising: melt kneading about 20 to about 36 weight percent of a poly(arylene ether), about 10 to about 35 weight percent of a polystyrene, and about 30 to about 50 weight percent glass fibers to form a composition; wherein all weight percents are based on the total weight of the composition; and wherein the composition exhibits a tensile strength of at least 140 megapascals measured at 23° C. according to ISO 527, a tensile knitline strength of at least 50 megapascals measured on a double-gated tensile bar according to ISO 527, a flexural strength of at least 180 megapascals measured at 23° C. according to ISO 178, and a melt volume-flow rate of at least 15 milliliters per 10 minutes measured at 300° C. and 10 kilogram load according to ISO 1133. Specifically, the composition can exhibit a tensile strength of 145 to about 160 megapascals, a tensile knitline strength of 55 to about 70 megapascals, a flexural strength of 180 to about 230 megapascals, and a melt volume-flow rate of 15 to about 25 milliliters per 10 minutes. Particularly effective melt kneading can be conducted at a temperature of about 333 to about 360° C., which is the temperature of the melt, measured via a probe within the extruder inner diameter. In some embodiments, melt kneading comprises extruding the composition at a temperature of about 350 to about 360° C. The temperature of the extruded composition can be measured by, for example, using an infrared temperature monitor (sometimes referred to as an "IR gun"). It is also particularly effective to conduct the melt kneading with an extruder having a die temperature of about 290 to about 320° C.

Other embodiments include compositions prepared by the above-described methods.

The invention is further illustrated by the following non-limiting examples.

Materials and Methods

Table 1 lists materials used throughout the working examples.

Compositions were compounded on a Werner & Pfleiderer ZSK-28 28-millimeter inner diameter twin-screw extruder. The extruder barrel temperatures from feed throat to die were 180, 260, 270, 280, 290, 290, and 300° C. Prior to compounding, all components were dry blended and added to the feed throat of the extruder, except for the glass fibers that were fed downstream via a side feeder.

Physical testing was conducted on parts injection molded using a barrel temperature of 60, 270, 290, 300, and 290° C. and a mold temperature of 100° C. Tensile strength values, expressed in units of megapascals (MPa), were measured at 23° C. according to ISO 527-2. Flexural strength values, expressed in units of megapascals, were measured at 23° C. according to ISO 178. Melt volume-flow rate values, expressed in units of milliliters per 10 minutes at 300° C. and 10 kilogram load, were measured according to ISO 1133. Tensile knitline strength values, expressed in units of megapascals, were measured at 23° C. on double-gated tensile bars according to ISO 527-2.

TABLE 1

| Material | Description |
| --- | --- |
| PPE 800 | Poly(2,6-dimethyl-1,4-phenylene ether) (CAS Reg. No. 25134-01-4) having a number average molecular weight of about 16,000 atomic mass units, a weight average molecular weight of about 55,000 atomic mass units, about 16 weight percent of molecules having a molecular weight less than 12,000 atomic mass units, and about 15 weight percent of molecules having a molecular weight greater than 100,000 atomic mass units; obtained as PPO 800 from GE Plastics |

TABLE 1-continued

| Material | Description |
|---|---|
| PPE 803 | Poly(2,6-dimethyl-1,4-phenylene ether) (CAS Reg. No. 25134-01-4) having a number average molecular weight of about 15,000 atomic mass units, a weight average molecular weight of about 49,000 atomic mass units, about 17 weight percent of molecules having a molecular weight less than 12,000 atomic mass units, and about 12 weight percent of molecules having a molecular weight greater than 100,000 atomic mass units; obtained as PPO 803 from GE Plastics |
| PPE 808 | Poly(2,6-dimethyl-1,4-phenylene ether) (CAS Reg. No. 25134-01-4) having a number average molecular weight of about 13,000 atomic mass units, a weight average molecular weight of about 36,000 atomic mass units, about 22 weight percent of molecules having a molecular weight less than 12,000 atomic mass units, and about 5 weight percent of molecules having a molecular weight greater than 100,000 atomic mass units; obtained as PPO 808 from GE Plastics |
| PS | Atactic homopolystyrene (CAS Reg. No. 9003-53-6); obtained as 1210 High Heat Crystal Polystyrene from Nova Chemicals or EB3300 from Chevron; |
| HIPS | High-impact polystyrene (CAS Reg. No. 9003-55-8); obtained as Empera 641F from Nova Chemicals, or HIPS 1897 from GE Plastics |
| Glass | E-Glass fibers (CAS Reg. No. 65997-17-3); obtained as FT-142A from Owens Corning |
| Mold Release | Linear Low Density Polyethylene (CAS Reg. No. 25087-34-7); Low Density Polyethylene (CAS Reg. No. 9002-88-4); obtained as ExxonMobil Escorene LL5100.09, or SABIC Stamylan LD 1922 T |
| Antioxidant | Octadecyl-3-(3,5-di-tert-butyl-4-hydroxyphenyl)propionate (CAS Reg. No. 2082-79-3); obtained as Great Lakes Anox PP18, Everspring Evernox 76, or Ciba Irganox 1076; |
| Stabilizer | Mixture of phosphonous acid esters (CAS Reg. No. 119345-01-6); obtained as Clariant Sandostab PEPQ or Ciba Irgafos PEPQ |
| Pigment | Carbon Black (CAS Reg. No. 1333-86-4); obtained as Heritage Channel Black |

Comparative Examples 1-7

Seven compositions were prepared using the formulations given in Table 2, where all component amounts are in parts by weight. All compositions contained more than 45 weight percent poly(arylene ether). The compositions vary primarily in the weight average molecular weight of the poly(arylene ether), and the amounts of polystyrene and rubber-modified polystyrene. Melt volume-flow rate (MVR), flexural strength (Flex. Str.), and tensile strength at yield (TYS) were determined for each composition. Property values are presented in Table 2. Although each composition exhibits a desired value of at least one property, none of the compositions exhibits desired values of all three tested properties.

TABLE 2

| | C. Ex. 1 | C. Ex. 2 | C. Ex. 3 | C. Ex. 4 | C. Ex. 5 | C. Ex. 6 | C. Ex. 7 |
|---|---|---|---|---|---|---|---|
| COMPOSITIONS | | | | | | | |
| PPE 800 | 48.1 | 0 | 48.1 | 0 | 0 | 0 | 0 |
| PPE 803 | 0 | 48.1 | 0 | 48.1 | 0 | 0 | 48.1 |
| PPE 808 | 0 | 0 | 0 | 0 | 48.1 | 48.1 | 0 |
| Mold Release | 1 | 1 | 1 | 1 | 1 | 1 | 1 |
| Antioxidant | 0.15 | 0.15 | 0.15 | 0.15 | 0.15 | 0.15 | 0.15 |
| Stabilizer | 0.15 | 0.15 | 0.15 | 0.15 | 0.15 | 0.15 | 0.15 |
| Pigment | 1 | 1 | 1 | 1 | 1 | 1 | 1 |
| PS | 10.6 | 10.6 | 5.3 | 5.3 | 5.3 | 10.6 | 10.6 |
| HIPS | 0 | 0 | 5.3 | 5.3 | 5.3 | 0 | 0 |
| Glass | 40 | 40 | 40 | 40 | 40 | 40 | 40 |
| PROPERTIES | | | | | | | |
| MVR (mL/10 min) | 7 | 10 | 7 | 9 | 40 | 45 | 7 |
| Flex. Str. (MPa) | 180 | 190 | 185 | 180 | 175 | 170 | 180 |
| TYS (MPa) | 125 | 135 | 125 | 115 | 120 | 125 | 125 |

Example 1, Comparative Examples 8-16

Ten compositions were prepared and tested as described above. Compositions and properties are presented in Table 3. Comparative Examples 9, 10, and 11 are replicates of each other, as are Comparative Examples 13 and 14, and Comparative Examples 15 and 16. All of the compositions contained less than 40 weight percent poly(arylene ether). The compositions vary primarily in the weight average molecular weight of the poly(arylene ether), and the amounts of polystyrene, rubber-modified polystyrene, and glass. Only one of the samples (Example 1), exhibits desired values of all four properties.

TABLE 3

|  | C. Ex. 8 | C. Ex. 9 | C. Ex. 10 | C. Ex. 11 | C. Ex. 12 |
|---|---|---|---|---|---|
| COMPOSITIONS |  |  |  |  |  |
| PPE 800 | 37.5 | 0 | 0 | 0 | 37.5 |
| PPE 803 | 0 | 37.5 | 37.5 | 37.5 | 0 |
| Mold Release | 1.5 | 1 | 1 | 1 | 1 |
| Antioxidant | 0.15 | 0.15 | 0.15 | 0.15 | 0.15 |
| Stabilizer | 0.15 | 0.15 | 0.15 | 0.15 | 0.15 |
| Pigment | 1 | 1 | 1 | 1 | 1 |
| PS | 12 | 10.6 | 10.6 | 10.6 | 10.6 |
| HIPS | 18.4 | 10.6 | 10.6 | 10.6 | 10.6 |
| Glass | 30 | 40 | 40 | 40 | 40 |
| PROPERTIES |  |  |  |  |  |
| MVR | 18 | 13 | 24 | 17 | 18 |
| Flex Str | 175 | 210 | 200 | 180 | 190 |
| TYS | 120 | 120 | 130 | 130 | 120 |
| Knit Line | 54 | 60 | — | 60 | — |

|  | C. Ex. 13 | C. Ex. 14 | C. Ex. 15 | C. Ex. 16 | Ex. 1 |
|---|---|---|---|---|---|
| COMPOSITIONS |  |  |  |  |  |
| PPE 800 | 0 | 0 | 37.5 | 37.5 | 0 |
| PPE 803 | 37.5 | 37.5 | 0 | 0 | 32.5 |
| Mold Release | 1 | 1 | 1 | 1 | 1 |
| Antioxidant | 0.15 | 0.15 | 0.15 | 0.15 | 0.10 |
| Stabilizer | 0.15 | 0.15 | 0.15 | 0.15 | 0.10 |
| Pigment | 1 | 1 | 1 | 1 | 1 |
| PS | 21.2 | 21.2 | 21.2 | 21.2 | 26.3 |
| HIPS | 0 | 0 | 0 | 0 | 0 |
| Glass | 40 | 40 | 40 | 40 | 40 |
| PROPERTIES |  |  |  |  |  |
| MVR | 15 | 23 | 13 | 24 | 21 |
| Flex Str | 220 | 200 | 220 | 200 | 211 |
| TYS | 160 | 145 | 160 | 140 | 155 |
| Knit Line | 40 | — | 55 | — | 60 |

Examples 2-5, Comparative Examples 17-19

Seven compositions were prepared and tested on commercial-scale compounding equipment. Comparative Examples 17-19 and Examples 2 and 3 were compounded on a Werner & Pfleiderer 92-millimeter two-lobe extruder. Examples 4 and 5 were compounded on Werner & Pfleiderer 120-millimeter two-lobe extruder. Comparative Examples 17, 18, and 19 were replicates of each other, as were Examples 2 and 3, and Examples 4 and 5. Examples 2 and 3 differed from Examples 4 and 5 only in the compounding equipment and conditions used.

The behavior of the strands extruded from the die was evaluated visually. Strand behavior was characterized as "bad" if there were several strand drops and it was difficult to keep the extruder running, "medium" if there were still several strand drops but it was possible to keep running, and "good" if there were almost no strand drops.

All seven compositions exhibited desirable property values for melt volume-flow rate, flexural strength, tensile strength at yield, and knit-line strength. However, only the inventive examples exhibited acceptable strand behavior.

TABLE 4

|  | C. Ex. 17 | C. Ex. 18 | C. Ex. 19 | Ex. 2 | Ex. 3 |
|---|---|---|---|---|---|
| COMPOSITIONS |  |  |  |  |  |
| PPE 803 | 37.5 | 37.5 | 37.5 | 32.5 | 32.5 |
| Mold Release | 1 | 1 | 1 | 1 | 1 |
| Antioxidant | 0.15 | 0.15 | 0.15 | 0.1 | 0.1 |
| Stabilizer | 0.15 | 0.15 | 0.15 | 0.1 | 0.1 |
| Pigment | 1 | 1 | 1 | 1 | 1 |
| PS | 21.2 | 21.2 | 21.2 | 26.3 | 26.3 |
| Glass | 40 | 40 | 40 | 40 | 40 |
| COMPOUNDING CONDITIONS |  |  |  |  |  |
| Barrel temp, $1^{st}$ section (° C.) | 300 | 300 | 300 | 300 | 300 |
| Barrel temp, $2^{nd}$ section (° C.) | 310 | 310 | 310 | 310 | 310 |
| Die temp. (° C.) | 320 | 320 | 320 | 320 | 320 |
| Melt temp. (° C.) | — | — | — | — | — |
| RPM | 300 | 272 | 299 | 299 | 299 |
| Torque (%) | 71 | 81 | 74 | 71 | 73 |
| SEC (kW-hr/kg) | 0.15 | 0.15 | 0.14 | 0.15 | 0.15 |
| Throughput (kg/hr) | 1200 | 1203 | 1208 | 1202 | 1206 |
| PROPERTIES |  |  |  |  |  |
| MVR | 15 | 15 | 16 | 20 | 21 |
| Flex Str | 216 | 201 | 197 | 223 | 212 |
| TYS | 144 | 151 | 155 | 151 | 155 |
| Knit Line | 60 | 60 | 59 | 59 | 59 |
| Strand behavior | bad | bad | bad | medium | medium |

|  | Ex. 4 | Ex. 5 |
|---|---|---|
| COMPOSITIONS |  |  |
| PPE, $M_w \approx 46{,}000$ | 32.5 | 32.5 |
| Mold Release | 1 | 1 |
| Antioxidant | 0.1 | 0.1 |
| Stabilizer | 0.1 | 0.1 |
| Pigment | 1 | 1 |
| PS | 26.3 | 26.3 |
| Glass | 40 | 40 |
| COMPOUNDING CONDITIONS |  |  |
| Barrel temp, $1^{st}$ section (° C.) | 290 | 290 |
| Barrel temp, $2^{nd}$ section (° C.) | 310 | 310 |
| Die temp (° C.) | 310 | 310 |
| Melt temp (° C.) | 363 | 360 |
| RPM | 151 | 151 |
| Torque (%) | 90 | 91 |
| SEC (kW-hr/kg) | 0.17 | 0.17 |
| Throughput (kg/hr) | 1023 | 1014 |
| PROPERTIES |  |  |
| MVR | 23 | 22 |
| Flex Str | 183 | 186 |
| TYS | 153 | 154 |
| Knit Line | 64 | 63 |
| Strand behavior | good | good |

This written description uses examples to disclose the invention, including the best mode, and also to enable any person skilled in the art to male and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A composition, consisting of:
   about 30 to about 35 weight percent of a poly(2,6-dimethyl-1,4-phenylene ether) having a post-compounding weight average molecular weight of about 50,000 to about 60,000 atomic mass units;
   about 20 to about 25 weight percent of an atactic homopolystyrene having a number average molecular weight of about 30,000 to about 100,000 atomic mass units;
   about 0.2 to about 2 weight percent of a mold release agent; and
   about 35 to about 45 weight percent glass fibers having a diameter of about 10 to about 20 micrometers; and
   optionally, up to 5 weight percent of an additive selected from the group consisting of stabilizers, processing aids, drip retardants, nucleating agents, dyes, pigments, antioxidants, anti-static agents, blowing agents, metal deactivators, antiblocking agents, fragrances, and combinations thereof;
   wherein all weight percents are based on the total weight of the composition; and
   wherein the composition is free of any polymer other than the poly(2,6-dimethyl-1,4-phenylene ether), the atactic homopolystyrene, and the mold release agent; and
   wherein the composition exhibits
      a tensile strength of at least 145 megapascals measured at 23° C. according to ISO 527,
      a tensile knitline strength of at least 55 megapascals measured on a double-gated tensile bar according to ISO 527,
      a flexural strength of at least 180 megapascals measured at 23° C. according to ISO 178, and
      a melt volume-flow rate of at least 15 milliliters per 10 minutes measured at 300° C. and 10 kilogram load according to ISO 1133.

2. The composition of claim 1, wherein the poly(arylene ether) has a pre-compounding weight average molecular weight of about 40,000 to about 50,000 atomic mass units.

3. The composition of claim 1, wherein the poly(arylene ether) has a pre-compounding molecular weight distribution comprising about 15 to about 20 weight percent of molecules having a molecular weight less than or equal to 12,000 atomic mass units.

4. The composition of claim 1, wherein the poly(arylene ether) has a pre-compounding molecular weight distribution comprising about 6 to about 15 weight percent of molecules having a molecular weight greater than or equal to 100,000 atomic mass units.

5. The composition of claim 1, wherein the composition exhibits
   a tensile strength of 145 to about 160 megapascals,
   a tensile knitline strength of 55 to about 70 megapascals,
   a flexural strength of 180 to about 230 megapascals, and
   a melt volume-flow rate of 15 to about 25 milliliters per 10 minutes.

6. An article consisting of a composition consisting of:
   about 30 to about 35 weight percent of a poly(2,6-dimethyl-1,4-phenylene ether) having a post-compounding weight average molecular weight of about 50,000 to about 60,000 atomic mass units;
   about 20 to about 25 weight percent of an atactic homopolystyrene having a number average molecular weight of about 30,000 to about 100,000 atomic mass units;
   about 0.2 to about 2 weight percent of a mold release agent; and
   about 35 to about 45 weight percent glass fibers having a diameter of about 10 to about 20 micrometers; and
   optionally, up to 5 weight percent of an additive selected from the group consisting of stabilizers, processing aids, drip retardants, nucleating agents, dyes, pigments, antioxidants, anti-static agents, blowing agents, metal deactivators, antiblocking agents, fragrances, and combinations thereof;
   wherein all weight percents are based on the total weight of the composition; and
   wherein the composition is free of any polymer other than the poly(2,6-dimethyl-1,4-phenylene ether), the atactic homopolystyrene, and the mold release agent; and
   wherein the composition exhibits
      a tensile strength of at least 145 megapascals measured at 23° C. according to ISO 527,
      a tensile knitline strength of at least 55 megapascals measured on a double-gated tensile bar according to ISO 527,
      a flexural strength of at least 180 megapascals measured at 23° C. according to ISO 178, and
      a melt volume-flow rate of at least 15 milliliters per 10 minutes measured at 300° C. and 10 kilogram load according to ISO 1133.

7. The article of claim 6, wherein the article is a water meter pressure plate.

8. The article of claim 6, wherein the article is fabricated by a method comprising injection molding, compression molding, or a combination thereof.

9. A method of preparing a composition, comprising:
   melt kneading components consisting of
   about 30 to about 35 weight percent of a poly(2,6-dimethyl-1,4-phenylene ether) having a post-compounding weight average molecular weight of
   about 50,000 to about 60,000 atomic mass units, about 20 to about 25 weight percent of an atactic homopolystyrene having a number average molecular weight of about 30,000 to about 100,000 atomic mass units,
   about 0.2 to about 2 weight percent of a mold release agent,
   about 35 to about 45 weight percent glass fibers having a diameter of about 10 to about 20 micrometers, and
   optionally, up to 5 weight percent of an additive selected from the group consisting of stabilizers, processing aids, drip retardants, nucleating agents, dyes, pigments, antioxidants, anti-static agents, blowing agents, metal deactivators, antiblocking agents, fragrances, and combinations thereof
to form a composition;
wherein all weight percents are based on the total weight of the composition;
wherein the composition is free of any polymer other than the poly(2,6-dimethyl-1,4-phenylene ether), the atactic homopolystyrene, and the mold release agent; and
wherein the composition exhibits
a tensile strength of at least 145 megapascals measured at 23° C. according to ISO 527,
a tensile knitline strength of at least 55 megapascals measured on a double-gated tensile bar according to ISO 527,
a flexural strength of at least 180 megapascals measured at 23° C. according to ISO 178, and
a melt volume-flow rate of at least 15 milliliters per 10 minutes measured at 300° C. and 10 kilogram load according to ISO 1133.

10. The method of claim 9, wherein the melt kneading comprises extruding the composition at a temperature of about 350 to about 360° C.

11. The method of claim 9, wherein the melt kneading comprises melt kneading with an extruder having a die temperature of about 290 to about 320° C.

* * * * *